United States Patent
Pechanec et al.

(10) Patent No.: US 9,355,264 B2
(45) Date of Patent: May 31, 2016

(54) SECRETLY TRANSMITTING MESSAGES OVER PUBLIC CHANNELS

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 960 days.

(21) Appl. No.: 12/713,804

(22) Filed: Feb. 26, 2010

(65) Prior Publication Data

US 2011/0213826 A1    Sep. 1, 2011

(51) Int. Cl.
*G06F 15/16* (2006.01)
*G06F 21/60* (2013.01)
*H04L 29/08* (2006.01)
*H04L 29/06* (2006.01)

(52) U.S. Cl.
CPC .............. *G06F 21/606* (2013.01); *H04L 67/06* (2013.01); *H04L 67/20* (2013.01); *G06F 2221/2107* (2013.01); *H04L 63/0428* (2013.01); *H04L 67/2823* (2013.01); *H04L 67/2842* (2013.01); *H04L 2209/16* (2013.01)

(58) Field of Classification Search
CPC ....... G06F 9/541; G06F 9/542; G06F 21/606; G06F 2221/2107; H04L 67/06; H04L 67/20; H04L 67/2842; H04L 67/2823; H04L 63/0428; H04L 2209/16
USPC .......................................... 709/203, 206, 204
See application file for complete search history.

(56) References Cited

U.S. PATENT DOCUMENTS

| | | |
|---|---|---|
| 2007/0174624 A1* | 7/2007 | Wolosewicz et al. .......... 713/176 |
| 2008/0040338 A1* | 2/2008 | Schwartz et al. ................. 707/5 |
| 2009/0003701 A1* | 1/2009 | Rekhi ............................. 382/176 |
| 2009/0094112 A1* | 4/2009 | Cesarini ............. G06Q 30/0236 705/14.36 |
| 2009/0220083 A1* | 9/2009 | Schneider ...................... 380/268 |
| 2009/0260061 A1* | 10/2009 | Lynch ................................ 726/3 |
| 2009/0271423 A1* | 10/2009 | Stallings ........................ 707/101 |
| 2009/0319686 A1* | 12/2009 | Watanabe ...................... 709/240 |
| 2010/0191656 A1* | 7/2010 | Martin et al. .................... 705/80 |

OTHER PUBLICATIONS

Slama et al. "Enterprise SOA: Service Oriented Architecture Best Practices". Prentice Hall Professional. 2005. Chapter 3, pp. 1-12.*

* cited by examiner

*Primary Examiner* — John Macilwinen
(74) *Attorney, Agent, or Firm* — Lowenstein Sandler LLP

(57) ABSTRACT

An apparatus and a method for secretly transmitting messages over public channels is described. Data from a first enterprise service bus (ESB) of a first computer system is encoded in a new media file using steganography. The new media file is transmitted to a third party server over a public channel. The new media file is then downloaded and decoded at a second enterprise service bus (ESB) of a second computer system.

26 Claims, 2 Drawing Sheets

SECRETLY TRANSMITTING MESSAGES OVER PUBLIC CHANNELS

TECHNICAL FIELD

Embodiments of the present invention relate to computing systems, and more particularly, to a process for transmitting sensitive data over public channels.

BACKGROUND

Communication between parties over public channels are susceptible to eavesdroppers. Negotiating a secure means of communication between two parties may take time and computer resources. Also, a party not being able to establishe a secure communication with another party may not be able to transmit and receive confidential data.

BRIEF DESCRIPTION OF THE DRAWINGS

The present invention is illustrated by way of example, and not by way of limitation, in the figures of the accompanying drawings and in which.

DETAILED DESCRIPTION

Figure 1:
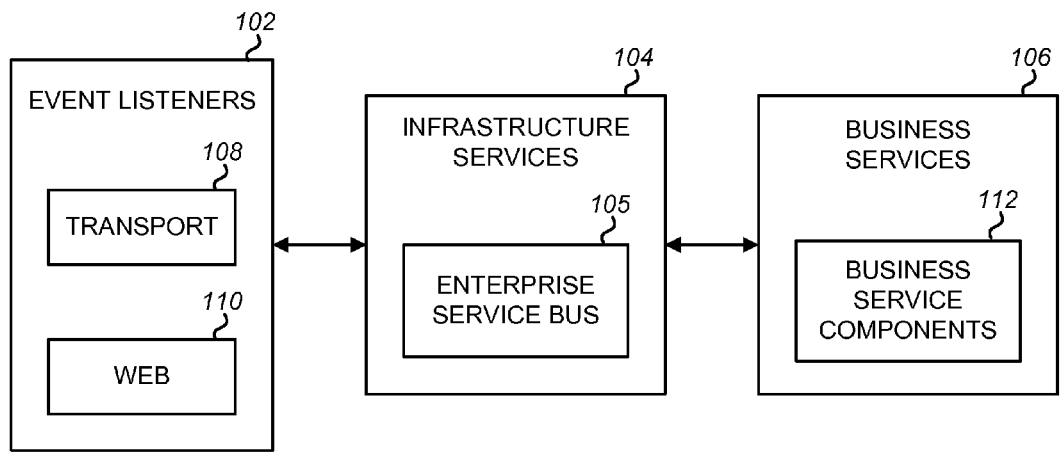
FIG. 1 is a block diagram illustrating one embodiment of a computer system architecture with enterprise service bus (ESB).

Described herein is an apparatus and a method for secretly transmitting messages over public channels. Data from a first enterprise service bus (ESB) of a first computer system is encoded in a new media file using steganography. The new media file is transmitted to a third party server over a public channel. The new media file is then downloaded and decoded at a second enterprise service bus (ESB) of a second computer system.

A service-oriented architecture (SOA) is a flexible set of design principles used during the phases of systems development and integration. A deployed SOA-based architecture will provide a loosely-integrated suite of services that can be used within multiple business domains.

SOA also generally provides a way for consumers of services, such as web-based applications, to be aware of available SOA-based services. For example, several disparate departments within a company may develop and deploy SOA services in different implementation languages; their respective clients will benefit from a well understood, well defined interface to access them. XML is commonly used for interfacing with SOA services, though this is not required.

SOA defines how to integrate widely disparate applications for a world that is Web based and uses multiple implementation platforms. Rather than defining an API, SOA defines the interface in terms of protocols and functionality. An endpoint is the entry point for such an SOA implementation.

Service-orientation requires loose coupling of services with operating systems, and other technologies that underlie applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

Enterprise Application Integration (EAI) is an integration framework composed of a collection of technologies and services which form a middleware to enable integration of systems and applications across the enterprise.

Supply chain management applications (for managing inventory and shipping), customer relationship management applications (for managing current and potential customers), business intelligence applications (for finding patterns from existing data from operations), and other types of applications (for managing data such as human resources data, health care, internal communications, etc) typically cannot communicate with one another in order to share data or business rules. For this reason, such applications are sometimes referred to as islands of automation or information silos. This lack of communication leads to inefficiencies, wherein identical data are stored in multiple locations, or straightforward processes are unable to be automated.

Enterprise application integration (EAI) is the process of linking such applications within a single organization together in order to simplify and automate business processes to the greatest extent possible, while at the same time avoiding having to make sweeping changes to the existing applications or data structures.

An enterprise service bus (ESB) consists of a software architecture construct which provides fundamental services for complex architectures via an event-driven and standards-based messaging-engine (the bus). Developers typically implement an ESB using technologies found in a category of middleware infrastructure products, usually based on recognized standards.

An ESB generally provides an abstraction layer on top of an implementation of an enterprise messaging system, which allows integration architects to exploit the value of messaging without writing code. Unlike the more classical enterprise application integration (EAI) approach of a monolithic stack in a hub and spoke architecture, an enterprise service bus builds on base functions broken up into their constituent parts, with distributed deployment where needed, working in harmony as necessary.

An ESB does not itself implement a service-oriented architecture (SOA) but provides the features with which one may implement such. An ESB builds on the basis of standards and provide flexibility, supporting many transport media capable of implementing both traditional SOA patterns as well as SOA 2.0-enriched business architecture. ESBs attempt to isolate the coupling between the service called and the transport medium. Most ESB providers incorporate SOA principles and allow for independent message formats.

FIG. 1 is a block diagram illustrating one embodiment of a SOA using an Enterprise Service Bus (ESB). The ESB is seen as the next generation of EAI. As such, many of the capabilities of a good ESB minor those of existing EAI offerings. Traditional EAI stacks consist of: Business Process Monitoring, Integrated Development Environment, Human Workflow User Interface, Business Process Management, Connectors, Transaction Manager, Security, Application Container, Messaging Service, Metadata Repository, Naming and Directory Service, Distributed Computing Architecture.

As with EAI systems, ESB is not about business logic that is left to higher levels. It is about infrastructure logic. ESB is part of an SOA infrastructure. ESBs typically come with a few assumptions that are not inherent to SOA:
  Java specific.
  Run-time message mediator.
  Message translation.
  Security model translation.

Loose coupling does not require a mediator to route messages, although that is dominant ESB architecture. This is also a requirement within the JBI specification. The ESB model should not restrict the SOA model, but should be seen as a concrete representation of SOA. As a result, if there is a conflict between the way SOA would approach something and the way in which is may be done in a traditional ESB, the SOA approach will win.

Therefore, in for example, JBossESB, mediation will be a deployment choice and not a mandatory requirement. Obviously for compliance with certain specifications it may be configured by default, but if developers do not need that compliance point, they should be able to remove it (generally or on a per service basis).

One large challenge of EAI is that the various systems that need to be linked together often reside on different operating systems, use different database solutions and different computer languages, and in some cases are legacy systems that are no longer supported by the vendor who originally created them. In some cases, such systems are dubbed "stovepipe systems" because they consist of components that have been jammed together in a way that makes it very hard to modify them in any way.

Back to FIG. 1, event listener module 102 includes transport module 108 and web module 110. Transport module 108 includes for example transports such as HTTP, FTP, Emails, among others. Web module 110 includes for example, Java scripts.

Data received from event listener module 102 is provided to an infrastructure service module. Infrastructure module 104 as previously described includes Enterprise Service Bus 105 (ESB). ESB 105 communicates with business services module 106. For example, business service module 106 includes business service components 112 (Java, Web services, etc. . . ). One ESB may want to communicate with another ESB over a public channel.

Figure 2:
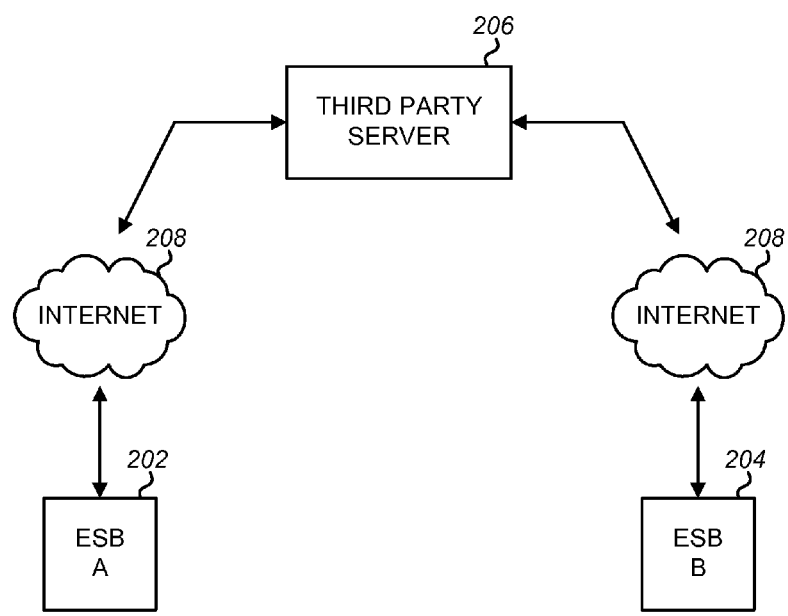
FIG. 2 is a block diagram illustrating one embodiment of a system for communicating sensitive data over public channels using a third party server.

FIG. 2 is a block diagram illustrating one embodiment of a system for communicating sensitive data over public channels using a third party server. A first ESB 202 is attempting to send sensitive or confidential data to a second ESB 204 over public channels (e.g. the Internet). In one embodiment, ESB 202 encodes the sensitive data in a new media file. What is meant by new media file is that ESB 202 cannot obtain an already known or published media file. By using an already known or published media file, an eavedropper may be able to compare an original media file with the encoded media file to determine the embedded sensitive data. As such a new original media file needs to be used.

The new media file is transmitted over public channels (e.g. Internet) to a third party server 206 where it is posted for public or private access. Third party server 206 may include for example, a media sharing service website accessible to public and private subscribers. Those of ordinary skill in the art will recognize that there are many websites allowing users to share their media files (video, pictures, audio).

In another embodiment, ESB 202 may be configured to automatically publish the new media file on a particular location on the third party server 206.

ESB 204 downloads the new media file from third party server 206 over public channel 208 and decodes it according to an encoding/decoding process already set up with ESB 202. In one embodiment, ESB 204 is subscribed to third party server 206 in such that whenever a new media file from ESB 202 is published to third party server 206, ESB 204 is automatically notified and automatically downloads the new media file from third party server 206.

In another embodiment, ESB 204 notifies ESB 202 that it has received the new media file. Upon notification, ESB 202 deletes the new media file from third party server 206. Third party server 206 may be or may not be associated with ESB 202 and 204.

Figure 3:
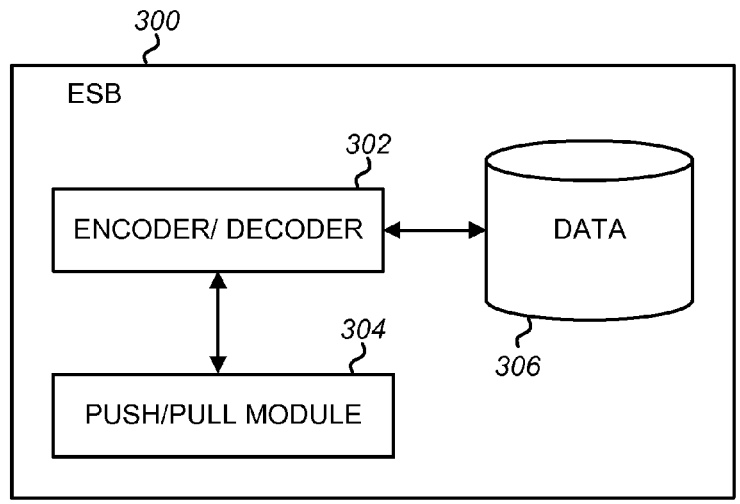
FIG. 3 is a block diagram illustrating one embodiment of an ESB.

FIG. 3 illustrates a diagrammatic representation of an ESB 300 in the exemplary form of a computer system within which a set of instructions, for causing the machine to perform any one or more of the methodologies discussed herein, may be executed. In alternative embodiments, the ESB 300 may be connected (e.g., networked) to other machines in a LAN, an intranet, an extranet, or the Internet. The machine 300 may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device comprising an encoder/decoder module 302 and a push/pull module 304, a main memory (e.g., read-only memory (ROM), flash memory, dynamic random access memory (DRAM) such as synchronous DRAM (SDRAM), a static memory (e.g., flash memory, static random access memory (SRAM), etc.), and a data storage device 306, which communicate with each other via a bus.

Encoder/decoder module 302 is configured to encode and decode data from a first enterprise service bus (ESB) of a first computer system in a new media file using for a coding algorithm, for example, steganography.

Push/pull module 304 is configured to upload/download the new media file to/from a third party server over a public channel. In one embodiment, push/pull module 304 is configured to automatically push/pull data to/from the third party server. The first ESB is configured to publish new media files to the third party server and the second ESB is configured to subscribe for new media file from the first ESB.

In one embodiment, the new media file includes a video file, a photographic file, a graphic file, or an audio file or a combination thereof. The second ESB can notifiy the first ESB to delete the new media file on the third party server after the second ESB finishes downloading the new media file.

Data storage device 306 can be used to store the new media file.

The processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute modules 302, 304 for performing the operations and steps discussed herein with. In one embodiment, modules 302, 304 may be include hardware or software or a combination of both.

The computer system may further include a network interface device. The computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device 306 may include a non-transitory computer-accessible storage medium on which is stored one or more sets of instructions embodying any one or more of the methodologies or functions described herein. The software may also reside, completely or at least partially, within the main memory and/or within the processing device during execution thereof by the computer system, the main memory and the processing device also constituting computer-accessible storage media. The software may further be transmitted or received over a network via the network interface device.

The computer-accessible storage medium may also be used to store unpacked new and released builds. While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 4:
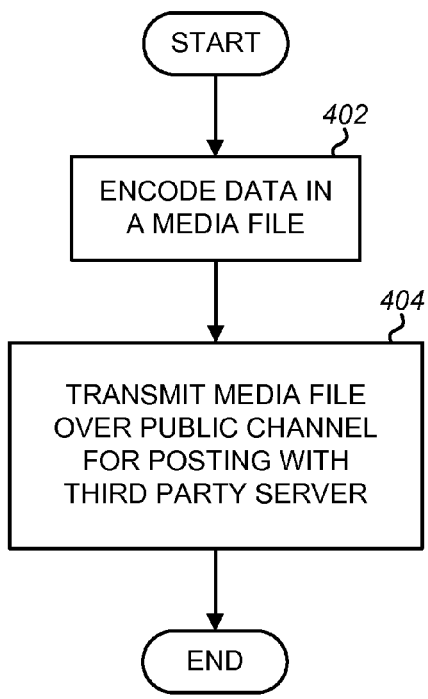
FIG. 4 is a flow diagram illustrating one embodiment of a method for sending data over public channels.

FIG. 4 is a flow diagram illustrating one embodiment of a method for sending data over public channels. At 402, a new media file is encoded by an encoder of an ESB. At 404, the new media file is transmitted over a public channel to a third party server.

Figure 5:
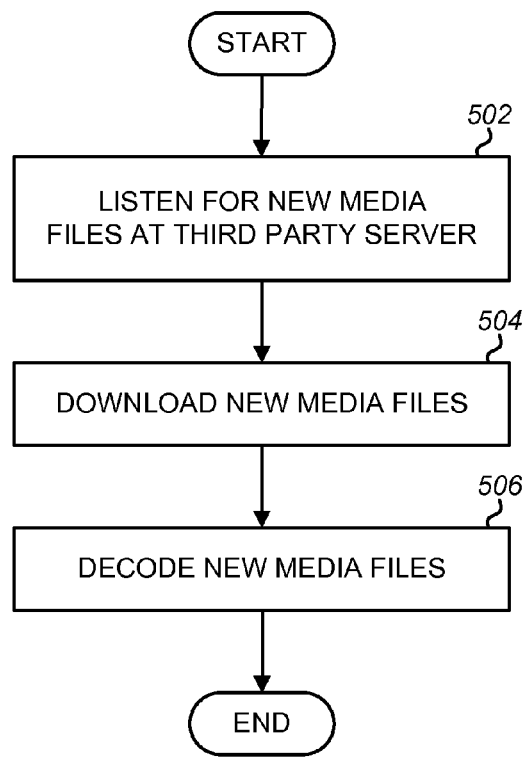
FIG. 5 is a flow diagram illustrating one embodiment of a method for receiving data over public channels.

FIG. 5 is a flow diagram illustrating one embodiment of a method for receiving data over public channels. At 502, an ESB listens for new media files at a pre-specified location of a third party server. At 504, upon detecting a new media file, the ESB downloads the new media files and decodes it at 506 pursuant to a pre-established encoding/decoding agreement with the ESB originating the new media file.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    establishing, by a processing device, an agreement between a first enterprise service bus (ESB) of a first computer system and a second ESB of a second computer system;
    encoding, by the processing device, data from the first ESB of the first computer system in a non-published file;
    publishing, by the processing device, the non-published file to a server independent from the first ESB and the second ESB, wherein the independent server is accessible to a public and a private subscriber over a public channel; and
    notifying, by the processing device, the second ESB of the second computer system of the published file to be downloaded from the independent server and decoded at the second ESB of the second computer system in view of the agreement.

2. The method of claim 1, wherein the first ESB is to automatically push data to the independent server.

3. The method of claim 1, wherein the second ESB is to automatically pull data from the independent server.

4. The method of claim 1, wherein the second ESB is to subscribe to the non-published file published by the first ESB.

5. The method of claim 1, wherein the non-published file is a media file comprising at least one of a video file, a photographic file, a graphic file, or an audio file.

6. The method of claim 1, wherein the second ESB notifies the first ESB to delete the published file on the independent server after the second ESB finishes downloading the published file.

7. The method of claim 1, wherein the first ESB transforms the non-published file from a first format to a second format.

8. The method of claim 1 wherein the non-published file is a new media file.

9. The method of claim 1 wherein the data is encoded from the first ESB in the non-published file using steganography.

10. The system of claim 1 wherein the non-published file is a new media file.

11. The system of claim 1 wherein the data is encoded from the first ESB in the non-published file using steganography.

12. A non-transitory computer-readable storage medium, having instructions stored therein, which when executed by a processing device cause the processing device to:
    establish, by the processing device, an agreement between a first enterprise service bus (ESB) of a first computer system and a second ESB of a second computer system;
    encode, by the processing device, data from the first ESB of the first computer system in a non-published file;
    publish, by the processing device, the non-published file to a server independent from the first ESB and the second ESB, wherein the independent server is accessible to a public and a private subscriber over a public channel; and
    notify, by the processing device, a the second ESB of the second computer system of the published file to be downloaded from the independent server and decoded at the second ESB of the second computer system in view of the agreement.

13. The non-transitory computer-readable storage medium of claim 12, wherein the first ESB is to automatically push data to the independent server.

14. The non-transitory computer-readable storage medium of claim 12, wherein the second ESB is to automatically pull data from the independent server.

15. The non-transitory computer-readable storage medium of claim 12, wherein the second ESB is to subscribe to the non-published file published by the first ESB.

16. The non-transitory computer-readable storage medium of claim 12, wherein the non-published file is a media file comprising at least one of a video file, a photographic file, a graphic file, or an audio file.

17. The non-transitory computer-readable storage medium of claim 12, wherein the second ESB notifies the first ESB to delete the published file on the independent server after the second ESB finishes downloading the published file.

18. The non-transitory computer-readable storage medium of claim 12, wherein the first ESB transforms the non-published file from a first format to a second format.

19. The non-transitory computer-readable storage medium of claim 12, wherein the non-published file is a new media file.

20. The non-transitory computer-readable storage medium of claim 12 wherein the data is encoded from the first ESB in the non-published file using steganography.

21. A system comprising:
    a memory; and
    a processing device operatively coupled to the memory to:
        establish an agreement between a first enterprise service bus (ESB) of a first computer system and a second ESB of a second computer system;
        encode data from the first ESB of the first computer system in a non-published file;
        publish the non-published file to a server independent from the first ESB and the second ESB, wherein the independent server is accessible to a public and a private subscriber over a public channel; and
        notify the second ESB of the second computer system of the published file to be downloaded from the independent server and decoded at the second ESB of the second computer system in view of the agreement.

22. The system of claim 21, wherein the first ESB is to automatically push data to the independent server, and wherein the second ESB is to automatically pull data from the independent server.

23. The system of claim 21, wherein the second ESB is to subscribe to the non-published file published by the first ESB.

24. The system of claim 21, wherein the non-published file is a media file comprising at least one of a video file, a photographic file, a graphic file, or an audio file.

25. The system of claim 21, wherein the second ESB is to notify the first ESB to delete the published file on the independent server after the second ESB finishes downloading the non-published file.

26. The system of claim 21, wherein the first ESB is to transform the non-published file from a first format to a second format.

* * * * *